US010447482B2

United States Patent
Spacek et al.

(10) Patent No.: US 10,447,482 B2
(45) Date of Patent: Oct. 15, 2019

(54) USING DOMAIN NAME SYSTEM FOR VERIFYING INTEGRITY OF APPLICATION PACKAGES

(71) Applicant: Red Hat, Inc., Raleigh, NC (US)

(72) Inventors: Petr Spacek, Brno (CZ); Tomas Hozza, Lubica (SK)

(73) Assignee: Red Hat, Inc., Raleigh, NC (US)

( * ) Notice: Subject to any disclaimer, the term of this patent is extended or adjusted under 35 U.S.C. 154(b) by 288 days.

(21) Appl. No.: 15/605,109

(22) Filed: May 25, 2017

(65) Prior Publication Data
US 2018/0343122 A1   Nov. 29, 2018

(51) Int. Cl.
*H04L 29/06* (2006.01)
*H04L 9/32* (2006.01)
*H04L 9/14* (2006.01)
*H04L 9/08* (2006.01)
*H04L 29/12* (2006.01)

(52) U.S. Cl.
CPC .......... *H04L 9/3247* (2013.01); *H04L 9/0891* (2013.01); *H04L 9/14* (2013.01); *H04L 9/3263* (2013.01); *H04L 61/1511* (2013.01); *H04L 2209/38* (2013.01)

(58) Field of Classification Search
CPC ... H04L 9/3247; H04L 9/3263; H04L 9/0891; H04L 61/1511; H04L 9/14; H04L 2209/38; H04L 9/30
See application file for complete search history.

(56) References Cited

U.S. PATENT DOCUMENTS

| 7,120,793 | B2  |    | 10/2006 | Hope et al. |
|-----------|-----|----|---------|-------------|
| 8,347,394 | B1  |    | 1/2013  | Lee |
| 8,645,700 | B2  |    | 2/2014  | Smith et al. |
| 9,294,284 | B1  |    | 3/2016  | Mao |
| 2011/0099617 | A1 | * | 4/2011 | Ponnath ................ G06F 21/52 726/7 |
| 2011/0321139 | A1 | * | 12/2011 | Jayaraman ............. G06F 21/51 726/4 |

(Continued)

OTHER PUBLICATIONS

Eric Osterweil et al., Managing Trusted Keys in Internet-Scale Systems, http://irl.cs.ucla.edu/papers/tas-fist09.pdf; UCLA; Colorado State University, pp. 1-4.

(Continued)

*Primary Examiner* — Amir Mehrmanesh
(74) *Attorney, Agent, or Firm* — Lowenstein Sandler LLP

(57) ABSTRACT

An example method includes obtaining a first public key associated with a private key of an application vendor of an application package signed with the private key. The first public key includes metadata including an identifier of the first public key. The method also includes transforming, via a processing device, the identifier into a Domain Name System (DNS) name, sending the DNS name to a DNS server to determine that the DNS name corresponds to a trustworthy source, in response to receiving, from the DNS server, a second public key associated with the DNS name in a DNS data store, confirming that the DNS name corresponds to the trustworthy source, and determining whether the second public key matches the first public key to verify whether the first public key and the associated private key used to sign the application package are authentic.

20 Claims, 5 Drawing Sheets

(56) References Cited

U.S. PATENT DOCUMENTS

| | | | | |
|---|---|---|---|---|
| 2012/0204032 A1* | 8/2012 | Wilkins | ............... | H04L 9/006 |
| | | | | 713/170 |
| 2013/0322632 A1* | 12/2013 | Manges | ................. | H04L 9/14 |
| | | | | 380/285 |
| 2014/0282847 A1 | 9/2014 | Blacka et al. | | |
| 2016/0286392 A1* | 9/2016 | Kanakarajan | ........ | H04B 7/1851 |
| 2017/0078336 A1* | 3/2017 | Aluvala | ............. | H04L 65/1069 |

OTHER PUBLICATIONS

John Dickinson, et al.; Tool Guide Series on DNSSEC, Version 1; https://library.educause.edu/~/media/files/library/2010/7/csd5928-pdf.pdf; 197 pages, Feb. 2010.

Adam Tkac et al.; Features/DNSSEC; FedoralProject, https://fedoraproject.org/wiki/Features/DNSSEC; 4 pages, Mar. 11, 2012.

Eric Osterweil et al.; Interadministrative Challenges in Managing DNSKEYs; http://web.cs.ucla.edu/~lixia/papers/09IEEES+P.pdf, University of California, Los Angeles, 8 pages; Sep. 2009.

Ramaswamy Chandramouli et al., Advanced Network Technology Division Information Technology Laboratory; Secure Domain Name System (DNS) Deployment Guide; Computer Security Division Information Technology Laboratory; 130 pages; Sep. 2013.

\* cited by examiner

US 10,447,482 B2

USING DOMAIN NAME SYSTEM FOR VERIFYING INTEGRITY OF APPLICATION PACKAGES

TECHNICAL FIELD

The present disclosure is generally related to a domain name system (DNS), and is more specifically related to securely using aspects of the DNS with public key cryptography to verify integrity of application packages.

BACKGROUND

Certain types of cryptography may be used by application (e.g., computer program) vendors to sign application packages prior to distribution. An application vendor may sign an application package using a private key and the signed application package may then be distributed along with the vendor's public key. It may be difficult for a user of the application package to verify the authenticity of the public key distributed with the application package, among other things.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
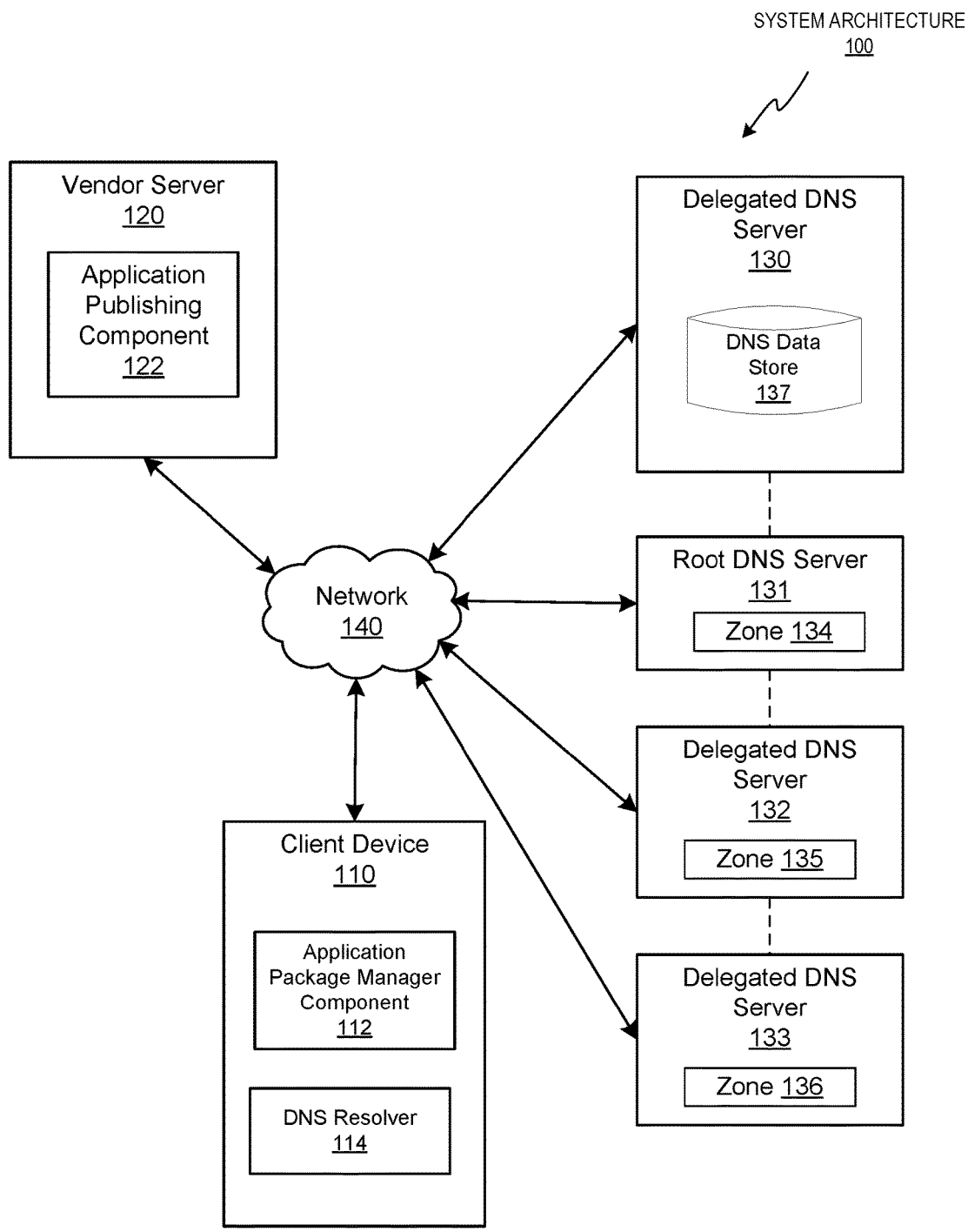
FIG. 1 depicts a high-level diagram of an example system architecture to verify authenticity of public keys and signatures of application packages using DNS services, in accordance with one or more aspects of the present disclosure.

A public key distributed with an application package may be used at a later point in time during automatic application update verification process. For example, when the vendor prepares a new version of the application package, the vendor may sign the new version using the same private key as for the previous version. The signed copy of the new application version may be published (e.g., via the Internet) and users and/or devices may download the new version of the application package. Verification may be performed to determine whether the signature of the new version matches the known public key distributed with the previous version of the application package. A match may provide proof that the application package was not tampered with by a third-party (e.g., by inserting malicious functionality), and thus, encourages the use of automatic application updates.

The technique of signing application packages described above is of limited use when an application package is installed for the first time. That is, because the application package is being installed for the first time, a client device installing the application package does not possess any information about the vendor's correct application package public key (hereinafter "AP public key"). In such cases, it may be up to the user to manually verify authenticity of the application package by some other means. The manual verification may entail some level of technical skills and time investment to obtain the correct AP public key from the vendor (e.g., by searching the application package and/or calling the vendor) for the application package. As such, users may skip the manual verification due to inconvenience.

Further, another limitation of the cryptographic technique for signing application packages described above relates to risks of key compromise. That is, in some cases, the vendor may lose access to the application package private key (hereinafter "AP private key") used for signing the application packages, the AP private key may be stolen or misused (e.g., by an employee of the vendor), or the like. As a result, the AP private key may not be trusted anymore. These situations may be problematic for a vendor to handle because the security of the application package update chain depends on the compromised AP private key.

Accordingly, described herein are methods and systems for improving the security of integrity verification for cryptographically signed application packages by aiding automated verification of application package AP public keys and application package signatures (hereinafter "AP signatures") and limiting the impact of AP private key compromise and/or misuse. An AP public key is associated with one AP private key (e.g., limited to one AP private key) as an application package key pair. The AP public key and/or the AP private key may be a very large number (e.g., hundreds of digits). The AP public key and the AP private key are mathematically bound. Thus, verifying that the AP public key is authentic also verifies that the AP private key is authentic.

A Domain Name System (DNS) may be used to enhance security of integrity verification for application packages signed with an AP private key. A DNS is a naming system for computing devices or any resources connected to the Internet or a private network. The DNS may translate an easy-to-remember DNS name into certain types of data (e.g., an AP public key associated with an AP private key used by an application vendor to sign an application package) stored in the DNS. The DNS may be used as a second communication channel to securely transmit information associated with a DNS name added by the application vendor, such as the AP public key associated with the AP private key used to sign the application package and flags regarding the AP private/public key (e.g., "this AP public key should be trusted," "this AP public key cannot be trusted," "this AP public key can be trusted for every application package signature except for 'XYZ' AP signature"). The DNS may securely transmit the information associated with the DNS name to client devices of the application packages using a cryptographic mechanism (e.g., DNS Security Extensions (DNSSEC)) that provides a separate chain of trust to verify integrity and authenticity of DNS responses from the one or more DNS servers.

The cryptographic mechanism (e.g., DNSSEC) may refer to a set of extensions to DNS which provide the DNS resolver on a client device with capability to authenticate the origin of DNS answers to ensure that a DNS answers received by a DNS resolver are authoritative. Thus, the cryptographic mechanism (e.g., DNSSEC) may be used to prevent threats, such as forging, to the DNS queries and DNS answers. The DNS resolver may include a hardware or application (e.g., computer program) component that is associated with the computer which determines the DNS servers responsible for mapping the DNS name to the desired data through queries (referred to as "DNS queries" herein). The DNS resolver may send a DNS query including the DNS name to a DNS server. The DNS server may maintain a data store with records of DNS names and associated data, such as an AP public key and metadata including flags, from which the DNS server may determine the relevant AP public key and metadata including flags for the DNS name and reply to the client device with a DNS answer including the relevant AP public key and metadata including flags stored in the data store.

Answers (e.g., every answer) from DNS servers in a zone protected by a cryptographic mechanism (e.g., DNSSEC) that provides (e.g., builds and/or uses) a separate chain of trust are digitally signed with a digital signature. By verifying the digital signature, the DNS resolver on the client device is able to determine data received from the DNS server are identical to that published by the zone owner (e.g., application vendor) and served by the DNS servers in the zone. Since the security of the cryptographic mechanism (e.g., DNSSEC) using a separate chain of trust may not depend on the security of the vendor's AP private key, using the cryptographic mechanism (e.g., DNSSEC) may improve the security of integrity verification if the vendor's AP private key is compromised and/or misused. The cryptographic mechanism (e.g., DNSSEC) may be used to verify the authenticity of an AP public key and/or AP private key used by a vendor to sign an application package, to distribute information about key revocation, and to distribute information about revoking particular signatures signed by particular AP private keys (e.g., to mitigate the impact of limited key misuse without revoking the AP private key completely), among other things.

The DNS names in the DNS are commonly organized hierarchically in a tree-like structure, and the DNS query for an AP public key of a DNS name or other type of data stored in a DNS data store may be accomplished recursively via a series of DNS servers in the DNS. A DNS name may include a concatenation of parts (or labels) that are separated by a dot. Under a root zone, the right-most label of a domain name corresponds to the top-level domain, and the hierarchy of domains descends from right to left, each label representing a subdivision or subdomain to the one on the right. For example, a DNS name of packages.entityname.com may include a top-level public domain of .com and subdomains of entityname.com and packages.entityname.com. The root domain may be represented by the empty string to the right of .com so that the hierarchy is the root domain (" ")→".com"→"entityname.com"→"packages.entityname.com" etc.

DNS names on the Internet may form a DNS name space in which the DNS names are organized hierarchically in a tree-type data structure. Further, the DNS name tree may be partitioned into zones with a root zone at the top of the DNS name tree. A root zone may be served by one or more root DNS servers that are authoritative. Zones below the root zone in the DNS name space may include domains and subdomains that may also be organized hierarchically as sub-trees of the DNS name tree. Each zone may be served by one or more DNS servers that may provide DNS answers to DNS queries from DNS resolvers. In response to a DNS query from a DNS resolver, the DNS server may provide a direct DNS answer that resolves the DNS query. For example, the resource records associated with a DNS zone served by the DNS server may allow the DNS server to respond with an AP public key and its metadata including flags or other type of data stored in a DNS data store for the requested DNS name. Alternatively, if the DNS server does not have the information, the DNS server may provide information of a delegated DNS server to the DNS resolver so that the DNS resolver may generate another DNS query to the delegated DNS server. In this way, a DNS query may be resolved through a series of DNS queries and DNS answers via a number of DNS servers serving a number of DNS zones.

In an example implementation of the present disclosure, a client device may download an application package from an entity's website, a disk, an application store, or the like. An application package manager component of the client device may obtain a first AP public key included with the application package. The application package manager component may transform the first AP public key into a DNS name. The DNS resolver may perform a DNS query by sending the DNS name to a DNS server to determine that the DNS name corresponds to a trustworthy source and, in response to the query, the DNS server may return a DNS answer including a second AP public key associated with the DNS name in a DNS data store. In an example, the DNS may determine whether the second AP public key returned by the DNS server was not tampered with by verifying that the second public key is secure according to standards of the cryptographic mechanism (e.g., DNSSEC) that provides a chain of trust and verifies authenticity of DNS responses using the chain of trust, as described in more detail below.

The client device may confirm that the DNS name corresponds to the trustworthy source in response to receiving the DNS answer with the second AP public key. Also, the application package manager component may determine whether the second AP public key matches the first AP public key to verify whether the first AP public key and the associated AP private key used to sign the application package are authentic. Additionally, the application package manager component may determine whether the first AP public key matches the AP signature to verify that the application package was signed by the AP private key associated with the first AP public key.

If the application package manager component determines that the source is trustworthy, the first AP public key is authentic, and the AP signature is authentic, a notification may be displayed on the client device indicating the identity (e.g., "name@entity.com") of the AP private key used to sign the key, the source of the AP public key has been verified, and/or the AP public key was not modified in transit. If the application package manager component determines that a full revocation record is included in a flag of metadata of the second AP public key, a notification may be displayed indicating that the AP public key should not be trusted. If the application package manager component determines that a partial revocation record is included in a flag of metadata of the second AP public key, a notification may be displayed indicating that the AP public key has been revoked for applications with a certain AP signature. Then, the application package manager component may determine whether the application under inspection on the client device includes the certain AP signature. If so, a notification may be displayed indicating that the application package should not be trusted. In some implementations, when a full revocation record and/or a partial revocation record is identified, the application package manager component may discard the application package under inspection.

With the foregoing in mind, FIG. 1 depicts a high-level diagram of an example system architecture 100 to verify authenticity of AP public keys and AP signatures of application packages using DNS services, in accordance with one or more aspects of the present disclosure. The system architecture 100 may include a client device 110, a vendor server 120, and one or more DNS servers (e.g., delegated DNS server 130, root DNS server 131, delegated DNS server 132, and delegated DNS server 133) that are communicatively coupled over a network 140 (e.g., internal or public). For example, the network 140 may be the Internet. The client device 110 may be any computing device (e.g., desktop computer, tablet computer, laptop computer, smartphone, etc.) capable of connecting to the vendor server 120 and the DNS servers 130-133 via the network 140. In an implementation, the delegated DNS server 130 may include a DNS data store 137. The DNS data store 137 may include just data that is served by the delegated DNS server 130.

The vendor server 120 may include an application publishing component 122. The application publishing component 122 may perform various operations to enable the client device 110 to verify the authenticity of the AP public keys and AP signatures included with downloaded application packages. For example, the application publishing component 122 may generate an application package (e.g., an executable) and sign the application package using an AP private key held just by the application vendor. The application publishing component 122 may add the AP public key associated with the AP private key to the application package. In some implementations, the AP public key may be added to a metadata field of a certificate included with the application package. Further, the application publishing component 122 may transform the AP public key into a DNS name and transfer (e.g., publish) the AP public key with the DNS name to the delegated DNS server 130 for storage in the DNS data store 137. Thus, when a DNS resolver 114 of the client device 110 queries the delegated DNS server 130 with the DNS name, the delegated DNS server 130 may retrieve the DNS answer including the AP public key associated with the DNS name and return the DNS answer to the DNS resolver 114. The application publishing component 122 may also publish the application package signed using the AP private key so the client device 110 may download the application package.

The client device 110 may include an application package manager component 112 and the DNS resolver 114. The DNS resolver 114 may be configured by the administrator of the client device 110 to provide DNS service to the client device 110 via the network 140. The application package manager component 112 may perform various operations to verify the authenticity of AP public keys and AP signatures when the client device 110 downloads the published application package. In an example, a certificate may be included with the downloaded application package. The certificate may include a metadata field with the AP public key. The application package manager component 112 may transform the AP public key into a DNS name. For example, the AP public key may include metadata with an identifier (e.g., "name@entity.com"). The application package manager component 112 may transform the identifier by mapping a symbol (e.g., "@") in the identifier to another symbol (e.g., ".") to form the DNS name (e.g., "name.entity.com"). In another example, the certificate included with the application package may include another metadata field for the DNS name associated with the AP public key. In such an instance, the vendor server 120 may have added the DNS name to the metadata field in the certificate prior to publishing the application package, as described above.

The DNS resolver 114 may perform various operations to enable the application package manager component 112 to verify the authenticity of public keys and application signatures when the client device 110 downloads the published application package. For example, the DNS resolver 114 may query the DNS servers 130, 131, 132, and/or 133 with the DNS name associated with the AP public key obtained from the application package. The DNS resolver 114 may also verify that the DNS answer including a second AP public key from the DNS servers 130, 131, 132, and/or 133 is secured according to standards of the cryptographic mechanism (e.g., DNSSEC) that builds a separate chain of trust. In an implementation, the DNS resolver 114 may send the second AP public key to the application package manager component 112, which performs verification of the first AP public key included in the application package and verifies the AP signatures using the second AP public key. It should be noted that the operations to verify the authenticity of the AP public keys and the AP signatures may be performed the first time an application package is downloaded and attempted to be installed, for any application package updates that are downloaded, and/or for application packages previously installed on the client device 110 that the user would like to verify.

Once the second AP public key is obtained by the DNS resolver 114 and verified as being secure according to standards of the cryptographic mechanism (e.g., DNSSEC), the DNS resolver 114 may determine that the DNS name corresponds to a trustworthy source (e.g., the data is received from a DNS owner associated with the DNS name and the data was not tampered with in transit). Also, the application package manager component 112 may determine whether the second AP public key matches the first AP public key to verify whether the first AP public key and the associated AP private key used to sign the application package are authentic. Additionally, after the first AP public key is verified as being from a trustworthy source and/or matching the second AP public key, the application package manager component 112 may determine whether the AP signature matches the first AP public key. If so, the application package manager component 112 may display a notification that the application package is signed by a trustworthy source (e.g., "name@entity.com") and the first AP public key is authentic and has not been modified in transit. If not, the application package manager component 112 may display another notification depending on whether the DNS answer includes a flag in the metadata of the second AP public key indicating that the AP public key has been fully revoked for each application package or partially revoked for certain application packages.

DNS servers 130, 131, 132, and 133 may be part of a DNS hierarchy including multiple DNS zones such as DNS zones 134, 135, and 136 through which the AP public key and associated metadata of the authoritative DNS server for a DNS name may be resolved recursively. At the top of the DNS hierarchy may be a root zone 134 (e.g., "." zone) including a root DNS server 131 which is authoritative in the sense that the root DNS server 131 may have the information to determine the AP public key and associated metadata of a DNS name within zones under the root DNS zone 134. For example, the root DNS server 131 may have the information of the DNS names and AP public keys of DNS servers responsible for top-level DNS names (such as .com, .org, .net etc.) or may have the information of the DNS server that have the names and AP public keys and other types of data other.

Under the root DNS zone 134 (e.g., "." zone or empty label " "), the DNS zones are organized hierarchically (e.g., in a tree-type structure). For example, the DNS hierarchy as shown in FIG. 1 includes the root DNS zone 134 with a branch to the DNS zone 135 (the ".com" zone) with a branch to the DNS zone 136 (the "entity.com" zone). The DNS server serving a higher level DNS zone may delegate tasks to a sub-domain of a lower-level DNS zone, including seeking answer to a DNS query and retrieving a DNS key for verifying a signed DNS data. For example, the root DNS server 131 serving the root zone 134 may delegate work to DNS server 132 serving zone 135. Each DNS zone may include one or more DNS servers and each DNS server may include (serve) one or more DNS zones.

In an implementation, the client device 110 includes a processing device (such as a central processing unit (CPU)) that may execute an operating system that manages the computing resources of the client device 110. For example, the operating system may schedule the execution of one or more applications, such as the application package manager component 112 and/or the DNS resolver 114, on the processing device. In an implementation, the applications 112 and 114 access information (e.g., first AP public keys, DNS names) obtained by downloaded application packages and remote resources (e.g., second AP public keys) identified in part by DNS names over the network 140.

For example, the DNS resolver 114 may access the DNS servers 130, 131, 132, and/or 133 over the network 140 to send DNS queries for resolving the AP public key of a DNS name. In an implementation, one of the external DNS servers may be designated as the default external DNS server that the client device 110 inquires first. For example, as shown in FIG. 1, the delegated DNS server 130 is the default external server. Other DNS servers (e.g., DNS server 131, 132, 133) are DNS servers which may be used by the delegated DNS server 130 for the answer of a DNS query. These DNS servers may be organized according to a tree structure. At the top of the tree may be the root DNS server 131 serving the root DNS zone 134 of the domain name system. Each DNS server except the DNS resolver 114 is authoritative for the part (sub-domain) of the DNS tree for which it is serving. In one implementation, the root DNS server 131 may be trusted because the root DNS server (and DNS resolver 114) may have cryptographic keys to establish a chain of trust. However, since the root DNS server 131 is at the top of the DNS server hierarchy that serves many client devices, the root DNS server 131 may not be the first resource to look for the answer to a DNS query in order to reduce the burden on the root DNS server 131.

The DNS servers may be an authoritative server (i.e., having the answer) or a recursive server (i.e., knowing which DNS server may have the answer) through which the DNS query may be resolved recursively. For example, the delegated DNS server 130 may include a recursive DNS server. In an implementation, the delegated DNS server 130, as a default DNS server to the client device 110 may receive a DNS query from the DNS resolver 114 of the client device 110 (e.g., to determine the AP public key of the requested DNS name or other type of data stored in the DNS data store 137, or to retrieve a DNS key associated with the DNS zone served by delegated DNS server 130). The recursive delegated DNS server 130 may look up resource records associated with DNS zones (e.g., 134, 135, 136) to determine if the recursive delegated DNS server 130 is able to resolve the query. If the recursive DNS resolver of the delegated DNS server 130 is able to, the external delegated DNS server 130 may send an answer including the requested AP public key to the resolver 114 of the client device 110. In one implementation, the DNS resolver 114 queries the root DNS server 131 for the DNS answer. The root DNS 131 may include an authoritative DNS name server. In response to receiving the DNS query, the authoritative DNS name server of the root DNS server 131 may have the answer (such as a second AP public key to a DNS name) or have the name (or address) of a DNS server that has the answer to the DNS query. The root DNS server 131 may send a resource record including the DNS answer or information of the DNS server that has the answer to the DNS resolver 114. For example, if the root DNS server 131 indicates that DNS server 132 may have the answer, the DNS resolver 114 may query the DNS server 132 so that that an authoritative name server of the DNS server 132 may resolve the query for the DNS 114. In this way, a DNS query may be resolved recursively.

In an example, a DNS server may serve a DNS zone that uses the cryptographic mechanism (e.g., DNSSEC) that has a DNS private key to digitally sign resource records transmitted from the DNS server serving the zone to DNS resolvers. For example, in an implementation, the DNS servers (e.g., 131, 132, 133) may serve a DNS zone that uses the cryptographic mechanism (e.g., DNSSEC) and digitally sign any resource records in the DNS answers with a DNS private key of the DNS zone. In an example, the DNS servers (e.g., 131, 132, 133) may also have a DNS public key (to form a DNS key pair with the DNS private key) that may be used to verify the DNS digital signatures of the resource records. The DNS servers (e.g., 131, 132, 133) may then transmit resource records containing the DNS answer, the DNS digital signatures of the DNS answer, and the DNS public key to the DNS resolver 114.

The DNS resolver 114 may receive the DNS answer, the DNS digital signature, and the DNS public key, and verify the DNS digital signature using the DNS public key to validate whether the received resource records containing the DNS answer may be authenticated with the DNS digital signature. If the DNS resolver 114 determines that the DNS digital signatures match the DNS answer, the DNS resolver 114 successfully authenticates the DNS answer. However, if the DNS resolver 114 determines that the DNS signatures of the received resource record do not match the DNS answer, the DNS resolver 114 may deem that the DNS signature is not authentic.

The DNS public key received from the delegated DNS server 130 may also need to be validated. The validation may include that the DNS public key is obtained through a chain of trust besides validating the DNS answer. In one example, the validation of the chain of trust may occur concurrently with the authentication of the DNS answer. The security-aware DNS resolver 114 may learn the zone's DNS public key either by having a trust anchor to store the DNS public key obtained via certain secure or trusted means outside the DNS protocol or by a process of normal DNS resolution. To determine whether the DNS public key learned via the DNS resolution is trusted, the DNS resolver 114 may trace the targeted DNS public key through trusted links to an eventual trust anchor.

In one example, the chain of trust may be established by checking a chain of trust from a trust anchor (e.g., keys in the root DNS zone) to the leaf DNS zones. For example, the Internet Assigned Number Authority (IANA)) may provide a key signing key (KSK) pair including a root KSK public key to establish a trust anchor. The root KSK public key is published while the root KSK private key is not. The root KSK private key may be used to sign a resource record containing a root ZSK key pair including a root zone signing key (ZSK) public key and a root ZSK private key. Similarly, the root ZSK public key is published while the root ZSK private key is not. The root ZSK private key may be securely stored in the root zone to sign resource records of the root zone. The security of the root ZSK public key is obtained by the signing using the root KSK private key. In the root zone 134, the root DNS server 131 may, in response to a DNS query from the DNS resolver 114, sign one or more resource records containing the DNS answers to the DNS resolver 114 using the private ZSK key. In the event that the root DNS server 131 needs to delegate to the DNS server 132, the root DNS server 131 may request from the delegated DNS server 132, a designated signer (DS) record which contains cryptographic hashes of public KSK keys to be used by the DNS resolver 114 to verify the chain of trust. The KSK key pair for the delegated DNS server may be used to sign and verify the ZSK key pair of the DNS zone that delegated DNS server serves. In this way, a chain of trust may be established from the root zone 134 to the zone 135 that the delegated DNS server 132 serves. The chain of trust may be recursively established all the way to the DNS zone that eventually provides the answer to the DNS query using the KSK and ZSK keys.

In an example, the DNS resolver 114 may resolve the chain of trust for the DNS public key received from delegated DNS server 130 through the DNS hierarchy. In an example, the DNS resolver 114 may determine a security state of the DNS answer received from the delegated DNS server 130 in view of the chain of trust built from the root DNS zone or from any other configured trust anchor.

In the implementation using the cryptographic mechanism (e.g., DNSSEC) that provides a separate chain of trust, after the verification by the DNS 114, the DNS answer is identified with a "Secure," "Insecure," "Bogus," or "Indeterminate" security state. The "Secure" state indicates that the DNS resolver 114 is able to verify a chain of trust from a trust anchor to the received DNS public key for the DNS digital signatures of the DNS answer and that DNS digital signatures match received DNS answer. The "Insecure" state indicates that the DNS resolver 114 is able to verify a chain of trust starting from a trust anchor and that this chain of trust contains a proof of non-existence of DNS record at some delegation point (e.g., DNS record was intentionally omitted by the administrator of the DNS zone supported by the delegated DNS server). As a result, the chain of trust ends prematurely before reaching DNS zone requested by the DNS resolver 114. The "Bogus" state indicates that the DNS resolver has a trust anchor and verified chain of trust through the DNS hierarchy indicating that the DNS answer is signed, but the DNS signature cannot be verified for certain reasons (e.g., missing DNS signatures, expired DNS signatures, or wrong DNS signatures). The "Bogus" state may indicate a possible spoof attack. The "Indeterminate" state indicates that there is no trust anchor that would indicate that a specific portion of the tree is secure. The "Indeterminate" state may mean that there is no trust anchor.

Figure 2:
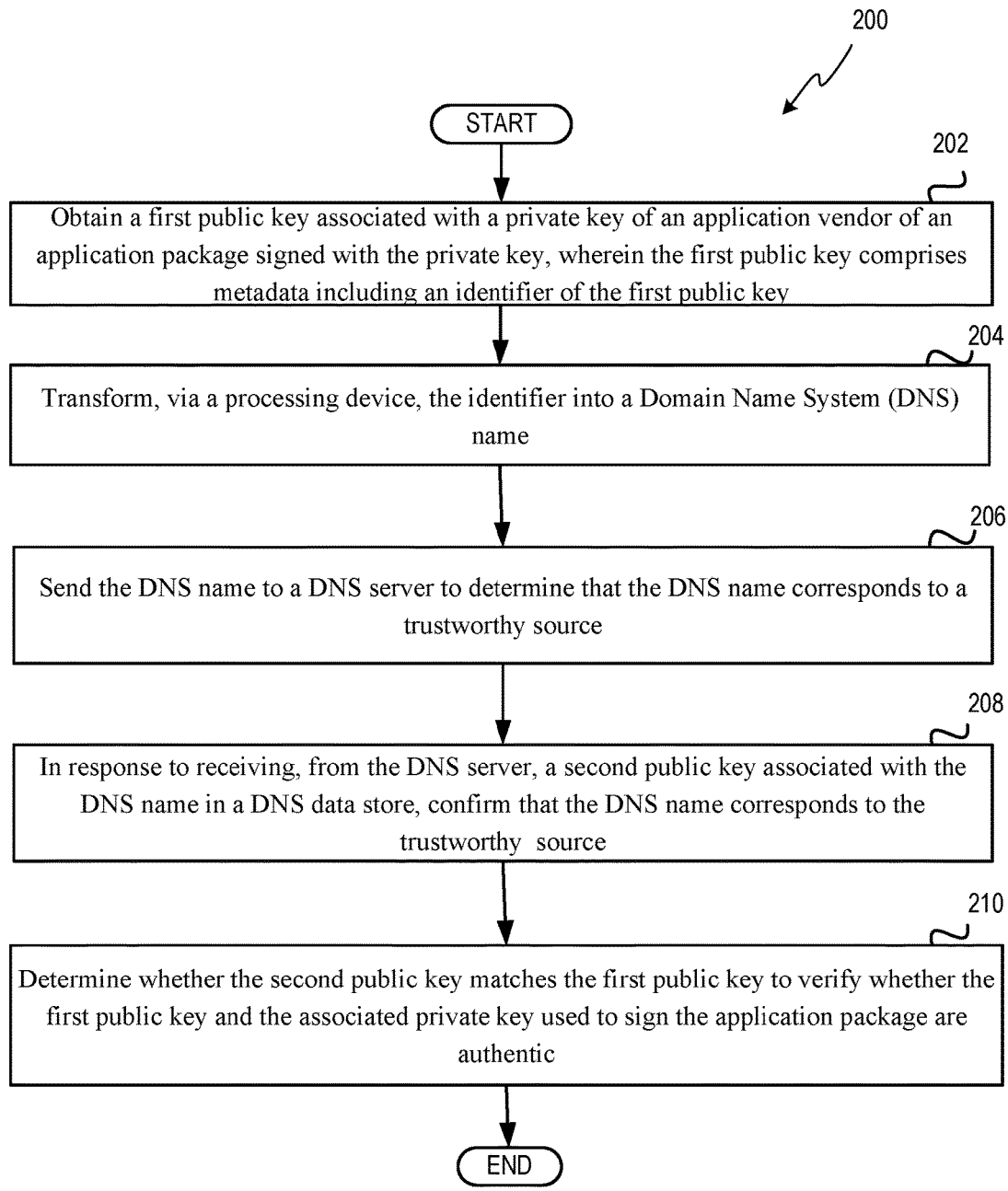
FIG. 2 depicts a flow diagram of an example method for a client to verify authenticity of public keys and signatures of application packages using DNS services, in accordance with one or more aspects of the present disclosure.

FIG. 2 depicts a flow diagram of an example method 200 for a client to verify authenticity of AP public keys and AP signatures of application packages using DNS services, in accordance with one or more aspects of the present disclosure. Method 200 and each of its individual functions, routines, subroutines, or operations may be performed by one or more processing devices of the computer device executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processes implementing method 200 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by the application package manager component 112 and/or the DNS resolver 114 executed by one or more processing devices of the client device 110.

Method 200 may begin at block 202. At block 202, a processing device executing the application package manager component 112 may obtain a first AP public key associated with an AP private key of an application vendor of an application package signed with the AP private key. The first AP public key may be a large number (e.g., 100 or more digits). In an example, the application package manager component 112 may search a certificate included with the application package to obtain the first AP public key. The first AP public key may be included in a metadata field in the certificate or in the application package. The first AP public key may include its own metadata with descriptive text, such as an identifier (e.g., "name@entity.com") of the source of the AP public key that signed the application package and published the application package. In one example, the metadata may include descriptive text that says "this application package was signed by AP public key (1234 . . . ) and the AP public key belongs to email address ("name@entity.com")." The processing device may also obtain an AP signature included in metadata of the certificate or the application package. Implementations of the present disclosure may be used to verify that the identifier is the correct owner of the AP public key, that the AP public key is authentic, and/or that the AP signature is authentic.

At block 204, the processing device may transform the identifier (e.g., "name@entity.com") of the first AP public key into a DNS name (e.g., "name.entity.com"). Transforming may include obtaining the DNS name from metadata of the first AP public key. As described above, in some instances, the vendor server 120 may insert the DNS name associated with the first AP public key in a metadata field of the application package or certificate included with the application package prior to publishing the application package. For example, the field may be a "SubjectAlternativeName" field if the certificate distributed with the software package has a particular form. However, in some instances, there may not be enough space in the metadata for the DNS name (e.g., metadata may be standardized to a certain amount). Thus, in one example, the processing device may transform the identifier ("name@entity.com") by mapping a symbol ("@") of the identifier to another symbol (".") to form the DNS name ("name.entity.com"). Any suitable technique may be used to map the identifier (e.g., email address) of the first public key to the DNS name. In some implementations, transforming an identifier of a first AP public key to a DNS name may be used on older application packages already installed on the client device 110. That is, conventional application packages may include an identifier with a first AP public key but not a DNS name. Thus, the processing device may inspect an application package already installed and obtain the identifier of the first AP public key and transform it into a DNS name using mapping, as described above. The authenticity of the older application package may be checked using the DNS name.

At block 206, the processing device executing the DNS resolver 114 may send the DNS name to the DNS server 130 to determine that the DNS name corresponds to a trustworthy source. That is, the DNS resolver 114 may send a DNS query with the DNS name derived from the identifier of the first AP public key to one or more of DNS servers 130, 131, 132, or 133. The process of querying the DNS servers 130, 131, 132, and/or 133 described above may be used to resolve the DNS name and obtain a DNS answer. The source may be the application package vendor. At block 208, the processing device may, in response to receiving, from the delegated DNS server 130, 131, 132, or 133, a second AP public key associated with the DNS name in the DNS data store 137, confirm that the DNS name corresponds to the trustworthy source. In an example, the processing device may assure the user that the signing AP private key matches the identifier (e.g., email address) of the source associated with the first AP public key by displaying a notification.

In an example, the DNS resolver 114 may determine whether the DNS answer from the DNS query is "Secure" by verifying the chain of trust is valid according to standards of the cryptographic mechanism (e.g., DNSSEC). This may be a protection against accepting a DNS answer with a forged second AP public key from the delegated DNS server 130, 131, 132, and/or 133. If the DNS answer is "Secure," the processing device may display a notification indicating that the second AP public key was not modified in transit. If the DNS answer is not "Secure," the processing device may display a notification that the second AP public key may have been modified in transit from the delegated DNS server 130, 131, 132, and/or 133.

In some instances, if a second AP public key is not returned, then the application package manager component 112 may determine that the DNS name does not correspond to a trustworthy source and the first AP public key should not be trusted and/or the application package should not be trusted. Further, the application package manager component 112 may automatically discard the application package.

The second AP public key may be a large number (e.g., 100 digits) and may include metadata. The metadata may include one or more flags, which may be used by the client device 110 to display as notifications. The flags may be descriptive text that provides various information that may be useful to the application package manager component 112 and/or the user. For example, the flags in the metadata may include text such as "this AP public key should be trusted," "this AP public key should not be trusted," "this AP public key should be trusted for all application packages except ones with AP signature X."

At block 210, the processing device may determine whether the second AP public key matches the first AP public key to verify whether the first AP public key and the associated AP private key used to sign the application package are authentic. Further, the processing device may determine whether the first AP public key matches the AP signature included in the certificate of the application package to verify that the application package was signed by the AP private key associated with the first AP public key. If the AP signature is verified, the processing device may display a notification that indicates the AP signature is authentic. If the AP signature is not verified, the processing device may display a notification that indicates the AP signature is not authentic and/or the application package should not be trusted.

In response to a determination that the second AP public key matches the first AP public key, verification that the first AP public key and the associated AP private key used to sign the application package are authentic, and/or verification that the AP signature is authentic, the processing device may display a notification (e.g., using data in a metadata flag of the second AP public key) indicating that the application package is signed with the AP private key, the identity (e.g., email address) of the application vendor (e.g., source) of the application package, the identity was verified, and the first AP public key was not modified in transit with the application package. In response to a determination that the second AP public key does not match the first AP public key, the processing device may determine that the first AP public key and the associated AP private key used to sign the application package are not authentic and display a notification indicating the same.

In another example, the metadata flag of the second AP public key may include a full revocation record indicating that the AP private/public key pair has been fully revoked by the application vendor. That is, in some instances a malicious entity may obtain access to the AP private key, and the application vendor may update a metadata flag of the DNS name associated with an AP public key in the DNS to indicate that the AP private key associated with a second AP public key is compromised and has been fully revoked. The processing device may display a notification that the AP private key that signed the application package has been compromised and cannot be trusted. Further, the notification may instruct the user to obtain another application package from the application vendor. In some instances, the processing device may discard any application packages signed that include the first AP public key associated with the compromised AP private key (e.g., obtained during an application update process).

In another example, the metadata flag of the second AP public key may include a partial revocation record. The partial revocation record may be used in scenarios where the AP private key is not completely compromised. For example, a malicious user may use the AP private key to sign one malicious version of the application package but did not obtain full access to the AP private key. In this example, just one version of the application package is malicious but other versions are not. As such, full revocation may be undesirable to subsequent application package updates but the particular malicious application package should be detected. The partial revocation record may indicate that the second AP public key can be trusted except for a particular AP signature of the application package. In response, the processing device may check the AP signature of the application package under inspection by hashing the AP signature obtained from the application package and comparing it to the AP signature provided in the metadata flag of the second AP public key or to a list of AP signatures obtained from the vendor server 120 via the network 140. If the AP signatures match, the processing device may determine that the application package is not authentic and may discard the application package and/or display a notification that the application package is not authentic. Further, the processing device may instruct the user to obtain an authentic version of the application package from the vendor server 120.

It should be noted that, in some instances, the application package may include more than one AP public key (e.g., 2, 3, 4, 5, etc.). The processing device of client device 110 may perform method 200 for each of the AP public keys. In an example, the processing device may determine that the application package is authentic (e.g., the AP public key) if just one of the AP public keys is matched with a second AP public key returned from the delegated DNS server 130, 131, 132, or 133. In another example, the processing device may determine that the application package is authentic if each of the public keys are matched to AP public keys from the delegated DNS server 130, 131, 132, or 133.

Additionally, in another example, an application package may be downloaded in parts, and there is an AP public key included with each application package part. The processing device of the client device 110 may perform method 200 for each AP public key obtained for each application package part. If each of the AP public keys obtained from the application package parts are verified as authentic, the processing device may determine to install each of the application package parts. If one or more of the AP public keys are not verified as authentic, the processing device may determine to not install any the application package parts.

Figure 3:
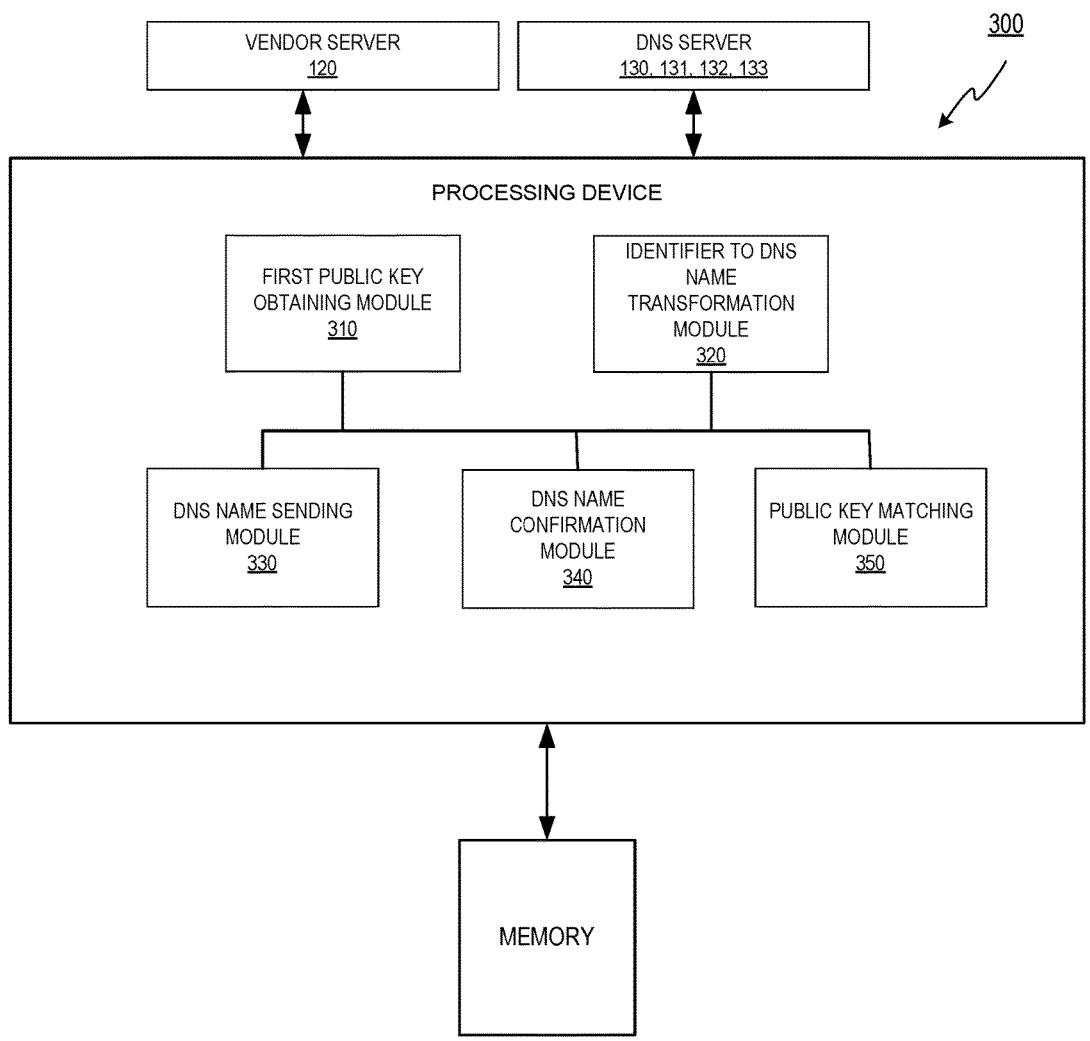
FIG. 3 depicts a block diagram of an example computer system, in accordance with one or more aspects of the present disclosure.

FIG. 3 depicts a block diagram of an example computer system 300, in accordance with one or more aspects of the present disclosure. Computer system 300 may be the same or similar to the client device 110 and may include one or more processing devices and one or more memory devices. In the example shown, computer system 300 may include first public key obtaining module 310, identifier to DNS name transformation module 320, DNS name sending module 330, DNS name confirmation module 340, and public key matching module 350. Also, as depicted, computer system 300 may be communicatively coupled to the vendor server 120 and the delegated DNS server 130, 131, 132, 133.

First public key obtaining module 310 may obtain a first AP public key associated with an AP private key of an application vendor of an application package signed with the AP private key. The first AP public key may include metadata including an identifier of the first AP public key. For example, the identifier may be an email address (e.g., "name@entity.com") associated with the vendor of the application package.

Identifier to DNS name transformation module 320 may transform, via the processing device, the identifier (e.g., "name@entity.com") of the first AP public key into a DNS name (e.g., "name.entity.com"). The transformation may include mapping one or more symbols ("@") of the identifier to one or more other symbols (".") to form the DNS name. In some instances, the DNS name may be obtained from metadata of the first AP public key included with the application package.

DNS name sending module 330 may send the DNS name to one or more DNS servers 130, 131, 132, and/or 133 to determine that the DNS name corresponds to a trustworthy source. The source may be the application vendor. The DNS name sending module 330 may access the DNS servers 130, 131, 132, and/or 133 via the network 140 and may send a DNS query including the DNS name derived from the identifier of the first AP public key to the one or more DNS servers 130, 131, 132, and/or 133.

DNS name confirmation module 340 may, in response to receiving a second AP public key associated with the DNS name in the DNS data store 137 from the DNS servers 130, 131, 132, and/or 133, confirm that the DNS name corresponds to the trustworthy source. Further, the DNS name confirmation module 340 may also determine whether the DNS answer received from the DNS servers 130, 131, 132, and/or 133 in response to the DNS query is valid by verifying the chain of trust according to standards of the cryptographic mechanism (e.g., DNSSEC), as described above.

Public key matching module 350 may determine whether the second AP public key matches the first AP public key to verify whether the first AP public key and the associated AP private key used to sign the application package are authentic. If determined to be authentic, the public key matching module 350 may cause a notification to be displayed indicating that the first AP public key is authentic, the identity of the source of the application package is verified, and/or the first AP public key has not been modified in transit.

Figure 4:
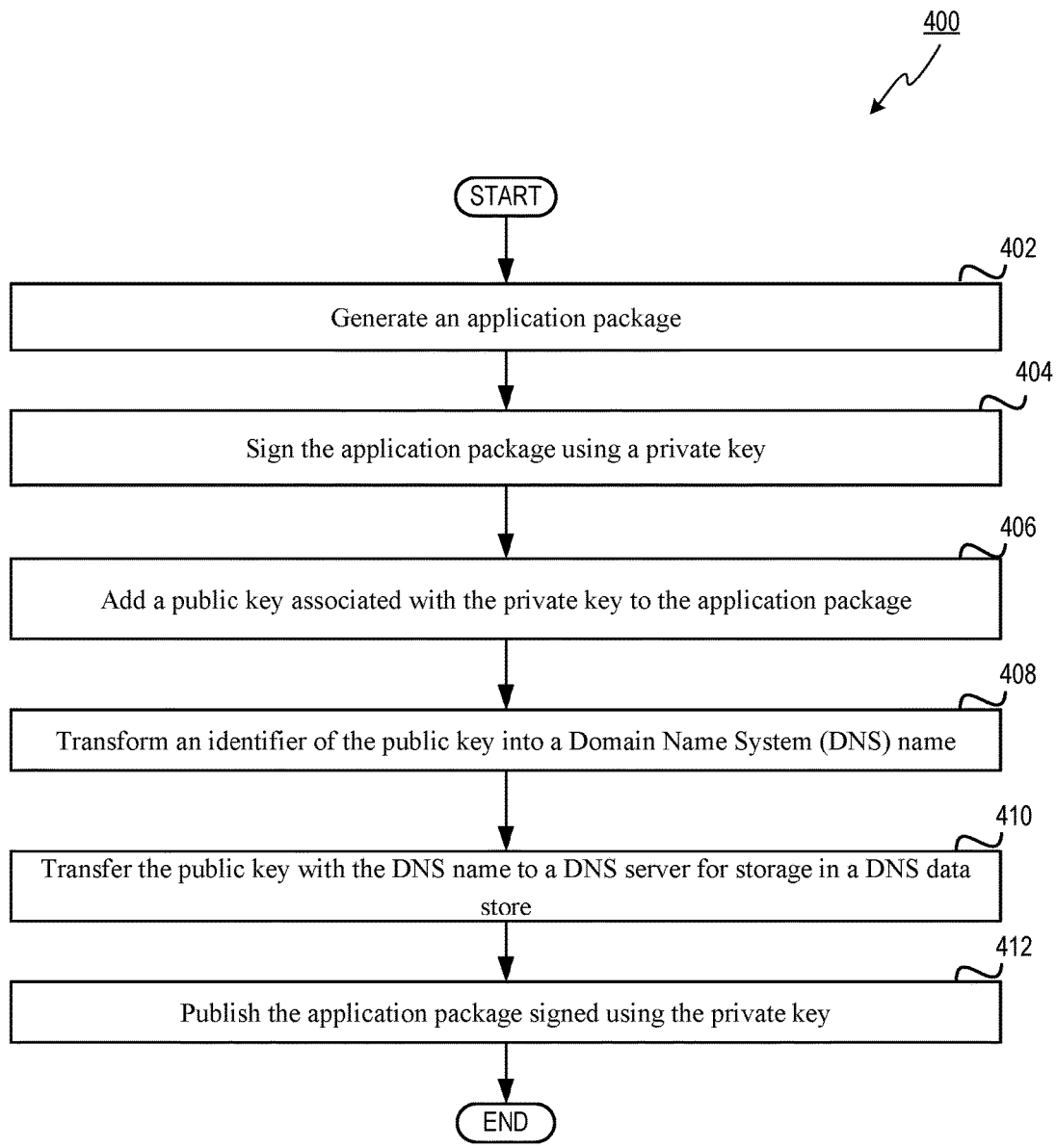
FIG. 4 depicts a flow diagram of an example method for a server to enable clients to verify authenticity of public keys and signatures of application packages using DNS services, in accordance with one or more aspects of the present disclosure.

FIG. 4 depicts a flow diagram of an example method 400 for the vendor server 120 to enable client devices 110 to verify authenticity of AP public keys and AP signatures of application packages using DNS services, in accordance with one or more aspects of the present disclosure. Method 400 includes operations performed by the vendor server 120. Also, method 400 may be performed in the same or a similar manner as described above in regards to method 200. Method 400 may be performed by processing devices of the vendor server 120 executing the application publishing component 122.

Method 400 may begin at block 402. At block 402, the processing device executing the application publishing component 122 may generate an application package. For example, the processing device may generate the application package by compiling the application into an executable. At block 404, the processing device may sign the application package using an AP private key. The AP signature may be included in a digital certificate of the application package. The AP private key may be private to the vendor server 120 and may not be shared with any other devices.

At block 406, the processing device may add an AP public key associated with the AP private key to the application package. The only entity that may insert data to a DNS has control over the DNS domain or subdomain that is being modified. For example, an administrator of a company may be able to add data to a DNS name of a domain for that company. Another user from a different company does not have access to the domain associated with the DNS name. In some implementations, the processing device may include additional data in metadata, such as an identifier (e.g., email address) of the AP public key, in the application package. The identifier may be used by the client device 110 after the application package is published to derive a DNS name. In an example, the processing device may add a DNS name associated with the AP public key to the metadata of the AP public key in the application package.

At block 408, the processing device may transform the identifier of the AP public key into a DNS name (e.g., "name.entity.com"). For example, the processing device may map one or more symbols ("@") of the identifier to one or more other symbols (".") to form the DNS name. In another example, the processing device may already have the DNS name and may bind the DNS name to the AP public key by adding the DNS name to the AP public key's metadata in the application package.

At block 410, the processing device may transfer the AP public key with the DNS name to the delegated DNS server 130 for storage in the DNS data store 137. That is, the processing device may publish the AP public key using the DNS name in a domain or subdomain of the DNS servers 130, 131, 132, and/or 133. In some implementations, the processing device may add metadata flags to the AP public key prior to publishing it in the DNS or may modify the metadata flags after the AP public key is published with the DNS name in the DNS. For example, the metadata flags may indicate whether the AP public key should be trusted, whether the AP private/public key pair has been revoked, whether the AP public key should be trusted except for application packages with a particular AP signature, and so forth.

At block 412, the processing device may publish the application package signed using the AP private key. Once published, the application package may be downloaded by the client device 110 and the client device may perform the method 200 described above to verify the authenticity of the AP public key and/or the AP signature included with the application package. If the AP public key and/or the AP signature are verified, the client device 110 may proceed to install the application package. If the AP public key and/or the AP signature are not verified, the application package may be malicious or tampered with in transit to the client device 110, and the client device 110 may not install the application package.

Figure 5:
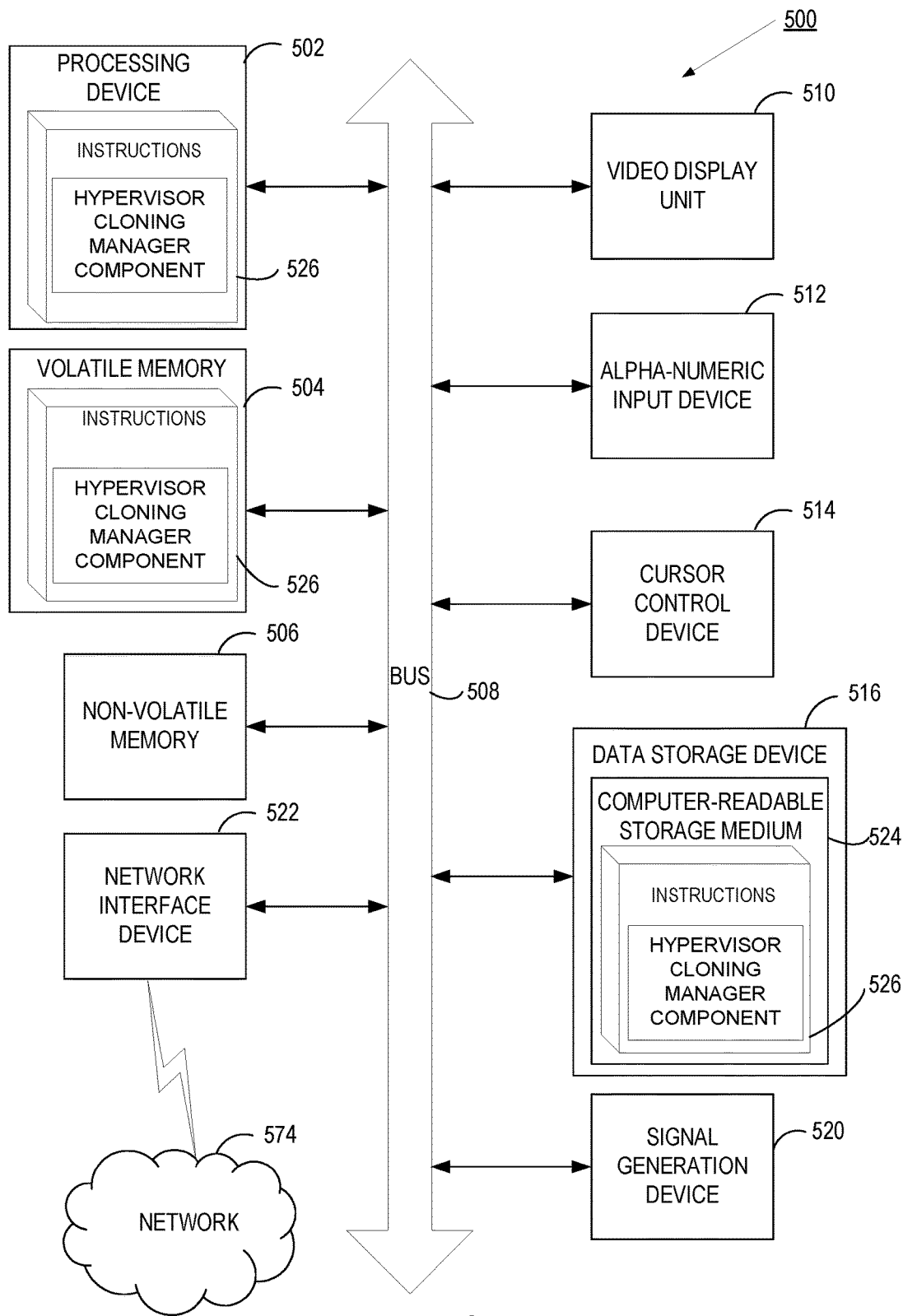
FIG. 5 depicts a block diagram of an illustrative computing device operating in accordance with the examples of the present disclosure.

FIG. 5 depicts a block diagram of a computer system operating in accordance with one or more aspects of the present disclosure. In various illustrative examples, computer system 500 may correspond to the client device 110 or the vendor server 120 of FIG. 1. In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alpha-numeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions encoding application package manager component 112 and DNS resolver 114 of FIG. 1 for implementing method 200, and instructions encoding application publishing component 122 of FIG. 1 for implementing method 400.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICs, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 200 and 400 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:
    obtaining a first public key associated with a private key of an application vendor of an application package signed with the private key, wherein the first public key comprises metadata including an identifier of the first public key;
    transforming, via a processing device, the identifier into a Domain Name System (DNS) name, wherein the transforming the identifier into the DNS name comprises mapping the first public key to the DNS name by replacing a first symbol of the first public key with a second symbol to form the DNS name;
    sending the DNS name to a DNS server to determine that the DNS name corresponds to a trustworthy source, wherein the DNS server stores a second public key associated with the DNS name in a DNS data store, the second public key and associated DNS name being received from a server as DNS metadata associated with the application package prior to publication of the application package; and
    in response to receiving, from the DNS server, the second public key associated with the DNS name in the DNS data store,
    confirming whether the DNS name corresponds to the trustworthy source by determining whether the second public key matches the first public key to verify whether the first public key and the associated private key used to sign the application package are authentic.

2. The method of claim 1, further comprising determining whether the first public key matches a signature of the application package to verify that the application package was signed by the private key associated with the first public key.

3. The method of claim 1, wherein confirming that the DNS name corresponds to the trustworthy source comprises verifying that the second public key was not tampered with in transit from the DNS server by verifying that the second public key is secure according to standards of a cryptographic mechanism that provides a chain of trust and verifies authenticity of DNS responses using the chain of trust.

4. The method of claim 1, further comprising, in response to a determination that the second public key matches the first public key and verification that the first public key and the associated private key used to sign the application package are authentic, displaying a notification indicating that the application package is signed with the private key and the first public key was not modified in transit with the application package.

5. The method of claim 1, further comprising, in response to a determination that the second public key does not match the first public key, determining that the first public key and the associated private key used to sign the application package are not authentic and displaying a notification indicating that the first public key is not trusted.

6. The method of claim 1, further comprising, in response to receiving, from the DNS server, a full revocation record in metadata included with the second public key associated with the DNS name in the DNS data store, discarding any application packages signed with the private key associated with the first public key that are obtained during an application update process.

7. The method of claim 1, further comprising, in response to receiving, from the DNS server, a partial revocation record in metadata included with the second public key associated with the DNS name in the DNS data store, determining whether a first application signature included with the partial revocation record matches a second application signature of the application package to identify that the application package is not authentic.

8. The method of claim 7, wherein the second application signature of the application package is determined by hashing the application package.

9. A system, comprising:
    a memory; and
    a processing device operatively coupled to the memory, the processing device to:
        obtain a first public key associated with a private key of an application vendor of an application package signed with the private key, wherein the first public key comprises metadata including an identifier of the first public key;
        transform the identifier into a Domain Name System (DNS) name, wherein, to transform the identifier, the processing device is to map the first public key to the DNS name by replacing a first symbol of the first public key with a second symbol to form the DNS name;
        send the DNS name to a DNS server to determine that the DNS name corresponds to a trustworthy source, wherein the DNS server stores a second public key associated with the DNS name in a DNS data store, the second public key and associated DNS name being received from a server as DNS metadata associated with the application package prior to publication of the application package; and
        in response to receiving, from the DNS server, the second public key associated with the DNS name in the DNS data store,
        confirm whether the DNS name corresponds to the trustworthy source by determining whether the second public key matches the first public key to verify whether the first public key and the associated private key used to sign the application package are authentic.

10. The system of claim 9, wherein the processing device is further to determine whether the first public key matches a signature of the application package to verify that the application package was signed by the private key associated with the first public key.

11. The system of claim 9, wherein the processing device is further to verify that the second public key was not tampered with in transit from the DNS server by verifying that the second public key is secure according to standards of a cryptographic mechanism that provides a chain of trust and verifies authenticity of DNS responses using the chain of trust.

12. A non-transitory machine-readable storage medium storing instructions that cause a processing device to:
    obtain a first public key associated with a private key of an application vendor of an application package signed with the private key, wherein the first public key comprises metadata including an identifier of the first public key;
    transform the identifier into a Domain Name System (DNS) name, wherein to transform the identifier, the processing device is to map the first public key to the DNS name by replacing a first symbol of the first public key with a second symbol to form the DNS name;
    send the DNS name to a DNS server to determine that the DNS name corresponds to a trustworthy source, wherein the DNS server stores a second public key associated with the DNS name in a DNS data store, the second public key and associated DNS name being received from a server as DNS metadata associated with the application package prior to publication of the application package; and
    in response to receiving, from the DNS server, the second public key associated with the DNS name in the DNS data store,
    confirm whether the DNS name corresponds to the trustworthy source by determining whether the second public key matches the first public key to verify whether the first public key and the associated private key used to sign the application package are authentic.

13. The non-transitory machine-readable storage medium of claim 12, wherein, to confirm that the DNS name corresponds to the trustworthy source, the instructions cause the processing device to verify that the second public key was not tampered with in transit from the DNS server by verifying that the second public key is secure according to standards of a cryptographic mechanism that provides a chain of trust and verifies authenticity of DNS responses using the chain of trust.

14. The non-transitory machine-readable storage medium of claim 12, wherein the instructions cause the processing device to determine whether the first public key matches a signature of the application package to verify that the application package was signed by the private key associated with the first public key.

15. The non-transitory machine-readable storage medium of claim 12, wherein the instructions cause the processing device to, in response to a determination that the second public key matches the first public key and verification that the first public key and the associated private key used to sign the application package are authentic, display a notification indicating that the application package is signed with the private key and the first public key was not modified in transit with the application package.

16. The non-transitory machine-readable storage medium of claim 12, wherein the instructions cause the processing device to, in response to a determination that the second public key does not match the first public key, determine that the first public key and the associated private key used to sign the application package are not authentic and display a notification indicating that the first public key is not trusted.

17. The non-transitory machine-readable storage medium of claim 12, wherein the instructions cause the processing device to, in response to receiving, from the DNS server, a full revocation record in metadata included with the second public key associated with the DNS name in the DNS data store, discard any application packages signed with the private key associated with the first public key that are obtained during an application update process.

18. The non-transitory machine-readable storage medium of claim 12, wherein the instructions cause the processing device to, in response to receiving, from the DNS server, a partial revocation record in metadata included with the second public key associated with the DNS name in the DNS data store, determine whether a first application signature included with the partial revocation record matches a second application signature of the application package to identify that the application package is not authentic.

19. The non-transitory machine-readable storage medium of claim 18, wherein the second application signature of the application package is determined by hashing the application package.

20. The non-transitory machine-readable storage medium of claim 12, wherein, to send the DNS name to the DNS server to determine that the DNS name corresponds to the trustworthy source, the instructions cause the processing device to send a query, including the DNS name to the DNS server and receive a response that includes the second public key using DNS Security Extensions (DNSSEC).

* * * * *